US007715789B2

(12) United States Patent
Park et al.

(10) Patent No.: US 7,715,789 B2
(45) Date of Patent: May 11, 2010

(54) METHOD AND APPARATUS MECHANICALLY PROVIDING AND/OR USING MODULATED AUDIO EFFECTS INTO THE INTERIOR OF HUMAN FLESH

(75) Inventors: Song Park, Berkeley, CA (US); Earle Jennings, Kensington, CA (US); Robert Spence, San Leandro, CA (US); John Larsen, North Vancouver (CA)

(73) Assignee: Song Park, Berkeley, CA (US)

( * ) Notice: Subject to any disclaimer, the term of this patent is extended or adjusted under 35 U.S.C. 154(b) by 1065 days.

(21) Appl. No.: 11/336,271

(22) Filed: Jan. 20, 2006

(65) Prior Publication Data

US 2006/0183961 A1 Aug. 17, 2006

Related U.S. Application Data

(60) Provisional application No. 60/645,881, filed on Jan. 20, 2005.

(51) Int. Cl.
*H04B 7/00* (2006.01)

(52) U.S. Cl. ........................ 455/41.1; 455/45; 455/205; 455/131; 455/41.2; 601/15; 601/78; 601/49; 601/72; 340/573.1; 340/566; 600/38; 600/80

(58) Field of Classification Search .................. 381/14, 381/15; 455/45, 205, 41.2, 41.1, 131; 340/573.1; 601/70, 72, 78; 600/38, 80
See application file for complete search history.

(56) References Cited

U.S. PATENT DOCUMENTS

| | | | | |
|---|---|---|---|---|
| 5,279,284 | A * | 1/1994 | Fenn | 601/108 |
| 5,848,982 | A * | 12/1998 | Hoshino et al. | 601/150 |
| 5,904,654 | A * | 5/1999 | Wohltmann et al. | 600/481 |
| 6,277,085 | B1 * | 8/2001 | Flynn | 601/80 |
| 6,277,985 | B1 * | 8/2001 | Gadwood et al. | 544/60 |
| 6,312,400 | B1 * | 11/2001 | Itikawa et al. | 601/100 |
| 6,517,500 | B2 * | 2/2003 | Ichikawa | 601/98 |
| 6,551,450 | B1 * | 4/2003 | Thomas et al. | 156/580.1 |
| 6,607,499 | B1 * | 8/2003 | Becher | 601/133 |
| 6,679,857 | B1 * | 1/2004 | Bastia et al. | 601/72 |
| 6,744,370 | B1 * | 6/2004 | Sleichter et al. | 340/576 |
| 6,916,300 | B2 * | 7/2005 | Hester et al. | 601/149 |
| 6,943,665 | B2 * | 9/2005 | Chornenky | 340/5.83 |
| 7,041,072 | B2 * | 5/2006 | Calvert | 601/111 |
| 7,122,015 | B2 * | 10/2006 | Luettgen et al. | 601/73 |
| 7,421,088 | B2 * | 9/2008 | Cranfill et al. | 381/386 |
| 7,510,537 | B2 * | 3/2009 | Imboden et al. | 601/70 |
| 2009/0131840 | A1 * | 5/2009 | Lee | 601/15 |

* cited by examiner

*Primary Examiner*—Marceau Milord
(74) *Attorney, Agent, or Firm*—Earle Jennings

(57) ABSTRACT

Method affecting the interior of human flesh, providing modulated power signal to at least one solenoid to create a modulated solenoid action delivered through a mechanical interface to the human flesh to create a modulated audio effect into the interior. Providing the modulated power signal may include receiving an audio signal to create the modulated power signal, which may include fetching a down-converted audio signal and the audio signal from a memory device and/or frequency-down-converting the audio signal to create the down-converted audio signal. Receiving the audio signal may further include solenoid amplifying the down-converted signal to create the modulated power signal. The modulated audio effect into the interior of the human flesh, the modulated power signal and the down-converted audio signal are products of this method. Apparatus implementing the solenoid amplifying, receiving the audio signal, frequency-down-converting the audio signal in a variety of configurations.

19 Claims, 17 Drawing Sheets

Fig. 2A
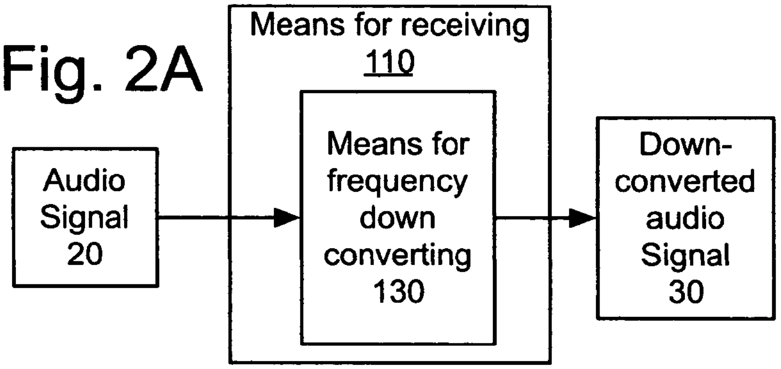
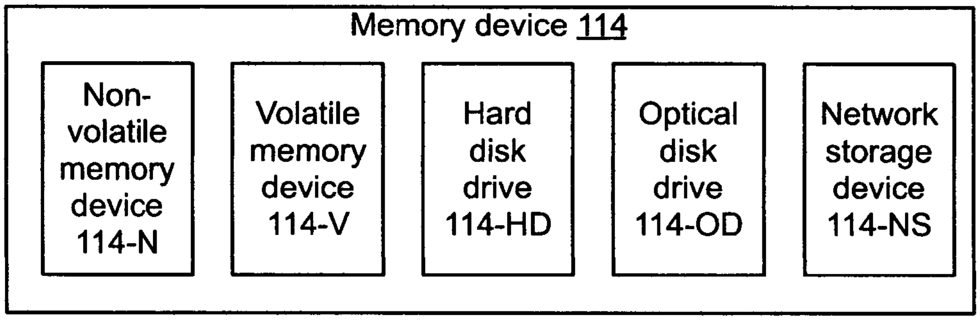
Fig. 2B
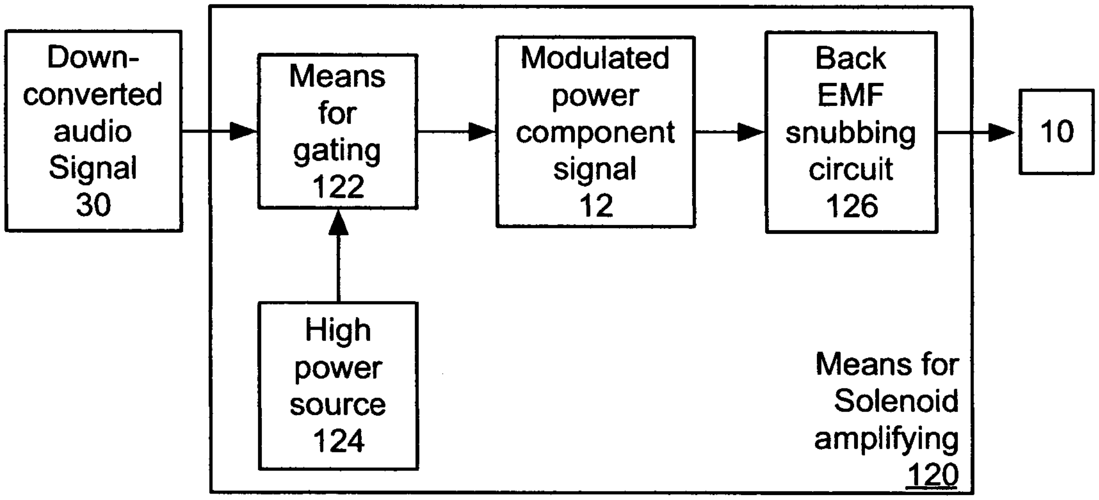
Fig. 2C

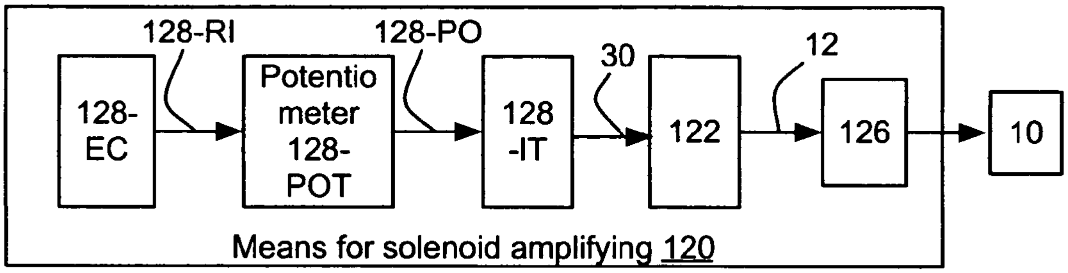
Fig. 6A
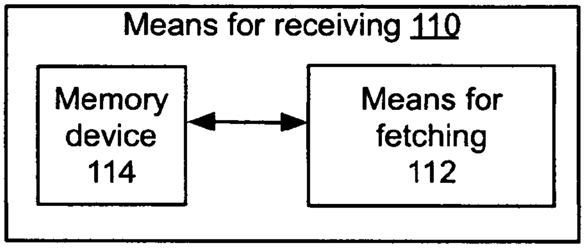
Fig. 6B
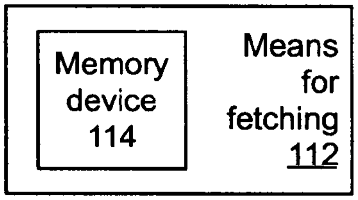
Fig. 6C
Fig. 6D
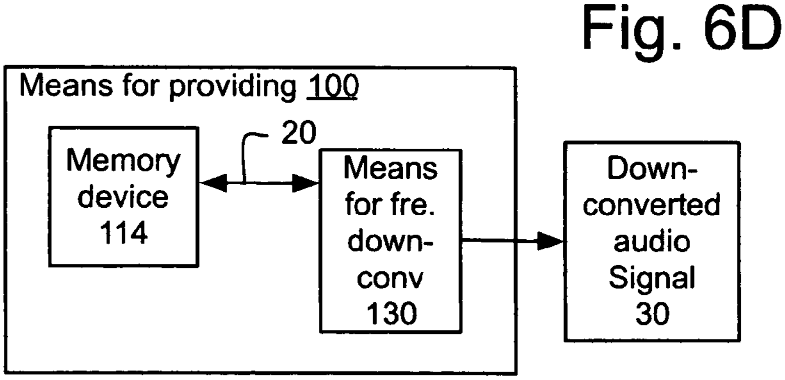

METHOD AND APPARATUS MECHANICALLY PROVIDING AND/OR USING MODULATED AUDIO EFFECTS INTO THE INTERIOR OF HUMAN FLESH

CROSS-REFERNCE TO RELATED APPLICATIONS

This application claims priority to provisional application No. 60/645,881 filed Jan. 20, 2005, which is incorporated herein by reference.

TECHNICAL FIELD

This invention relates to providing modulated audio effects into the interior of human flesh, in particular to methods and apparatus inducing modulated audio effects into the interior of human flesh, and their use.

BACKGROUND OF THE INVENTION

There are a large number of devices, which mechanically affect interior human flesh. In particular, there are various massage related devices, which act upon to push, pull and/or suction skin to affect human flesh. Most of these machines use an electric motor to repeatedly perform the same mechanical action. The effect of these machines is to induce a mechanical vibration on the affected human flesh whose frequency spectrum is essentially an unmodulated single carrier frequency. Such machines, while able to affect the interior human flesh to some extent, have some serious problems. Many people report the "buzzing" effect to grow increasingly annoying, in some cases, making the machines unacceptable for use. Some of these devices are used to as sex aids. Again, the "buzzing" is often a problem, leading these devices to tend to be used for arousal, but often being unable to bring sexual climax to the user. What is needed are devices which can effectively deliver modulated audio action to the interior of human flesh.

Some devices claim to be or have "vibro-acoustic speakers", which purportedly have some special ability to deliver acoustic vibrations into flesh. However, these devices often rely upon fairly standard acoustic speaker technology, often woofer and/or sub-woofers, to deliver the acoustic vibrations to the skin. There are several problems with this approach. First, an acoustic wave crossing from air through skin to flesh experiences a large and varied attenuation. Some parts of the human body, such as bone conduct sound quite well, whereas several of the soft tissues absorb it for the most part. Second, there is little that can be done to control where the sound is delivered. By way of example, a woofer or sub-woofer may well be 30 centimeters (cm) or 12 inches across. This is far wider than even the largest muscles of the human leg or arm. Mechanisms and methods are needed which can deliver modulated audio actions to specific regions of the interior of human flesh.

There are a number of devices which deliver a mechanical vibration to skin which can induce an unmodulated carrier frequency in the acoustic or sub-acoustic frequency ranges. What is needed is a mechanism or method by which such devices could induce modulated audio action to interior human flesh.

Several devices provide pulse wave modulated actions to skin, for various stated reasons. These devices often feel as though someone is being tapped or hit repeatedly, and can grow quite irritating over a relatively short period of time. What is needed are mechanisms and methods which deliver a smoother modulation to the skin.

SUMMARY OF THE INVENTION

The invention includes a method of affecting the interior of human flesh, by providing a modulated power signal to at least one solenoid to create a modulated solenoid action, and the solenoid delivering the modulated solenoid action through a mechanical interface to the human flesh to create a modulated audio effect into the interior of the human flesh.

Providing the modulated power signal may include receiving an audio signal to create the modulated power signal. Receiving the audio signal may include fetching a down-converted audio signal and the audio signal from a memory device and/or frequency-down-converting the audio signal to create the down-converted audio signal. Receiving the audio signal may further include solenoid amplifying the down-converted signal to create the modulated power signal. Solenoid amplifying the down-converted signal may include gating at least one high power source by the down-converted audio signal to create at least one modulated power component signal, and providing that to at least one back Electro-Magnetic Force (EMF) snubbing circuit to create the modulated power signal and suppress back EMF from the solenoid.

The modulated audio effect into the interior of the human flesh is a product of this process. This effect is both pleasing and relaxing to the human, as it can vary with an audio signal being heard. The modulated power signal and the down-converted audio signal are also products of this method. The modulated power signal can drive apparatus including the solenoids to create the modulated audio effect. The down-converted audio signal can be readily calculated and efficiently stored in a memory device. By way of example, assume that the down-converted audio signal has a maximum frequency of 128 Herz (Hz) and that the signal is sample four times per Hz, for 512 samples per second. A typical audio channel is sampled about 48K times per second, roughly 96 times more frequently. The down-converted audio signal has less than one percent of the bandwidth of just one audio signal. Contemporary audio files often have two audio channels, so that an augmented audio file including the down-converted audio signal would gain less than one percent in size, but have a new and pleasurable effect which could be presented in not only hand held vibrating massagers, but also furniture, such as chairs, sofas, beds and cushions.

The invention includes apparatus implementing the solenoid amplifying, receiving the audio signal, frequency-down-converting the audio signal in a variety of configurations. The various means for frequency down-converting may be implemented with finite state machines and/or computers. The finite state machines may be further made by use of programmable logic devices, application specific integrated circuits, and memory devices.

BRIEF DESCRIPTION OF THE DRAWINGS

FIGS. 1A to 13B show examples of mechanisms implementing various aspects of the invention's method of affecting the interior of human flesh;

DETAILED DESCRIPTION

Figure 1A:
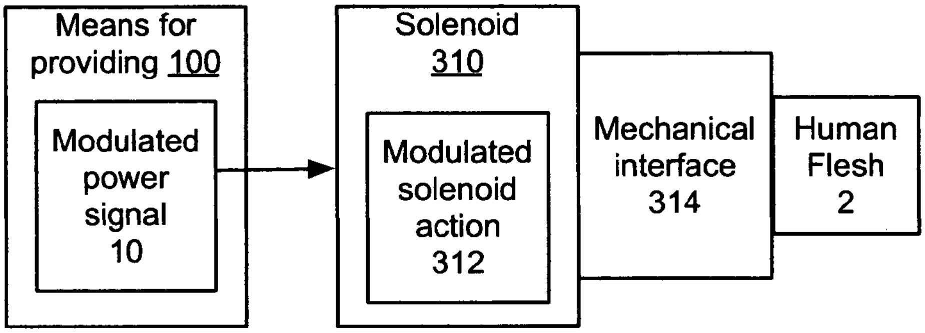

This invention relates to providing modulated audio effects into the interior of human flesh, in particular to methods and apparatus inducing modulated audio effects into the interior of human flesh, and their use.

The invention includes a method affecting the interior of human flesh, by providing a modulated power signal 10 to at least one solenoid 310 to create a modulated solenoid action 312. The solenoid delivers the modulated solenoid action through a mechanical interface 314 to the human flesh 2.

Figure 14:
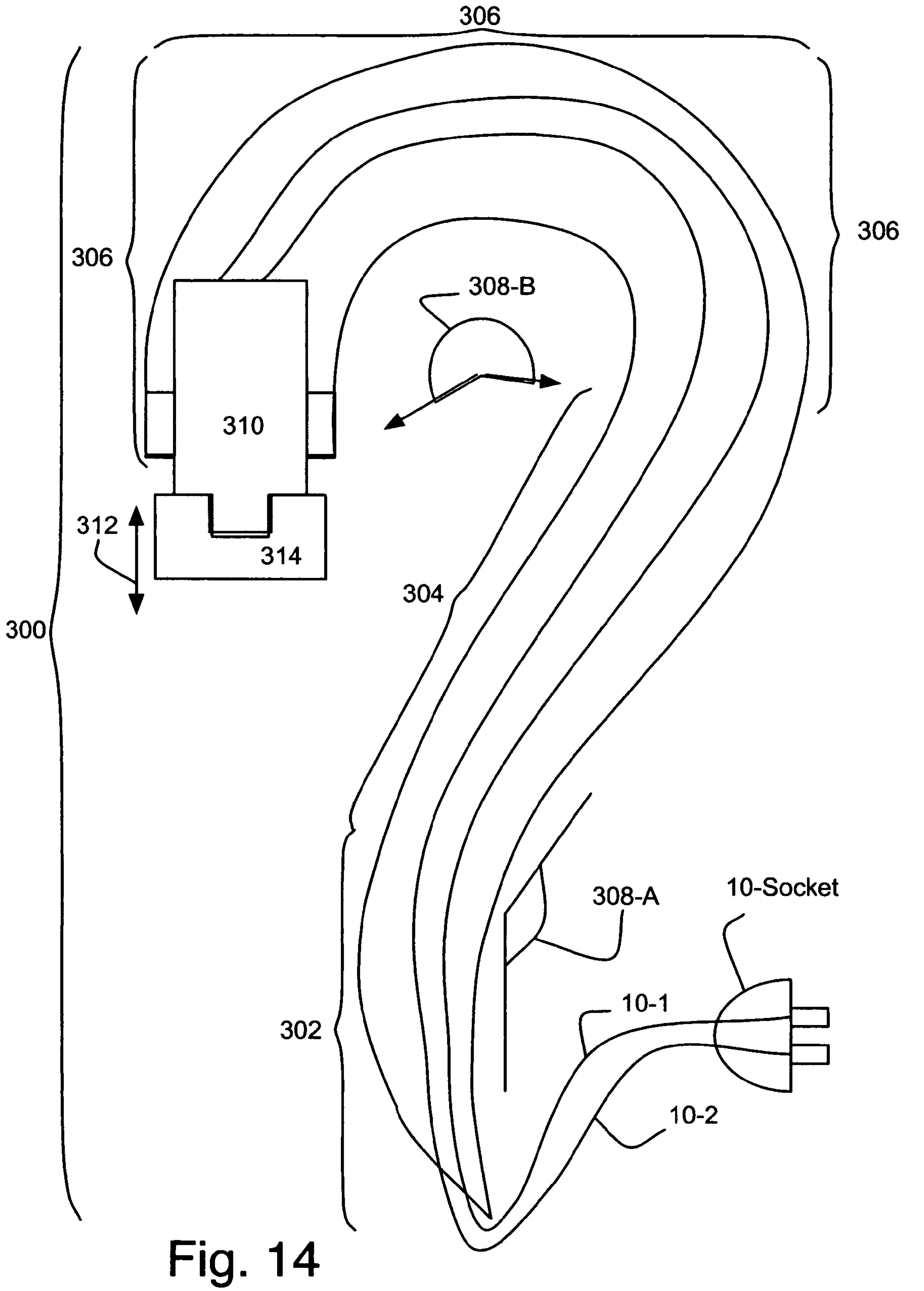
FIGS. 14 to 16 show examples of hand held vibrating massagers including the solenoid and mechanical interface used to affect human flesh, as discussed in the previous Figures.
Figure 15:
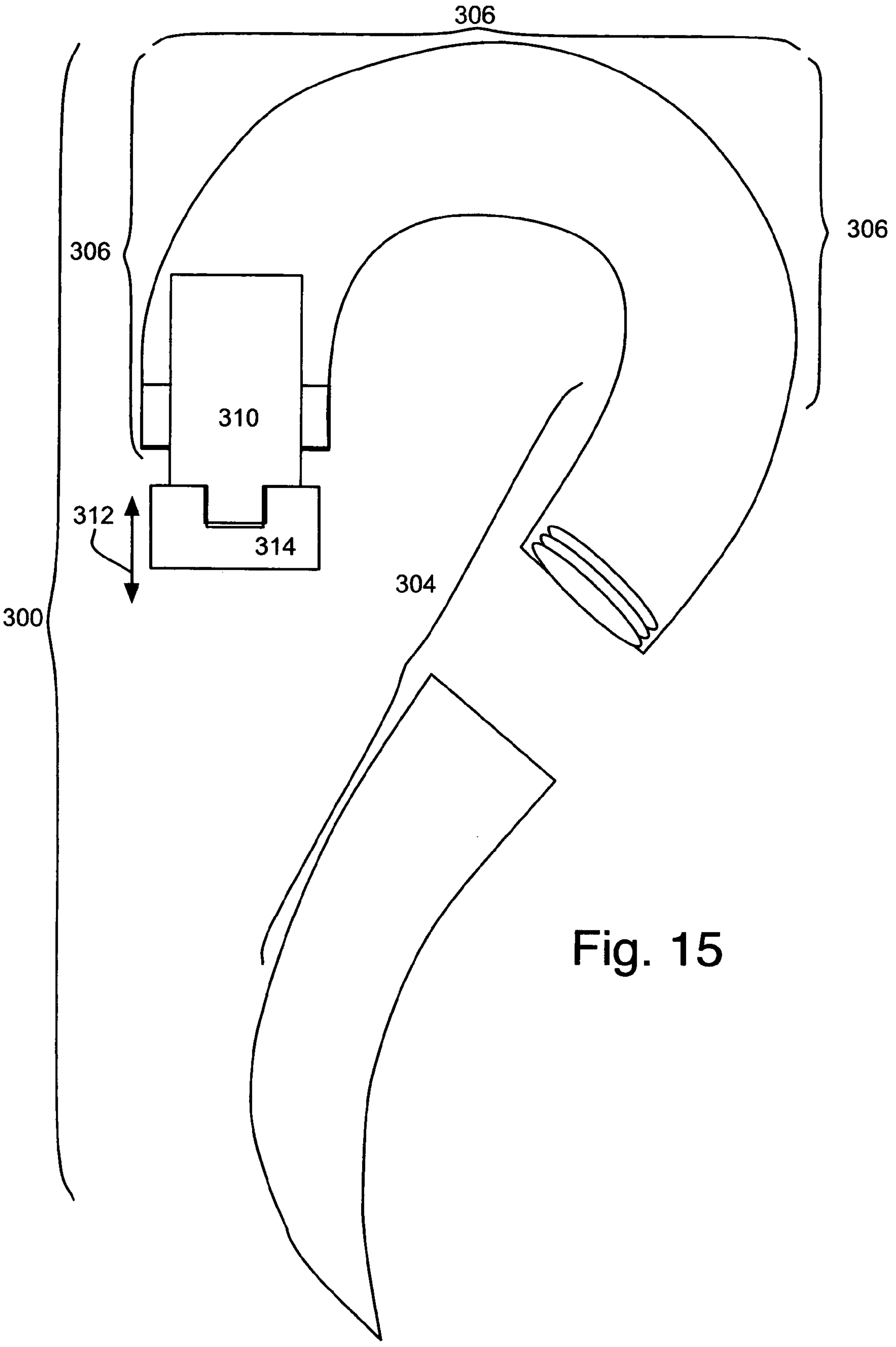
Figure 16:
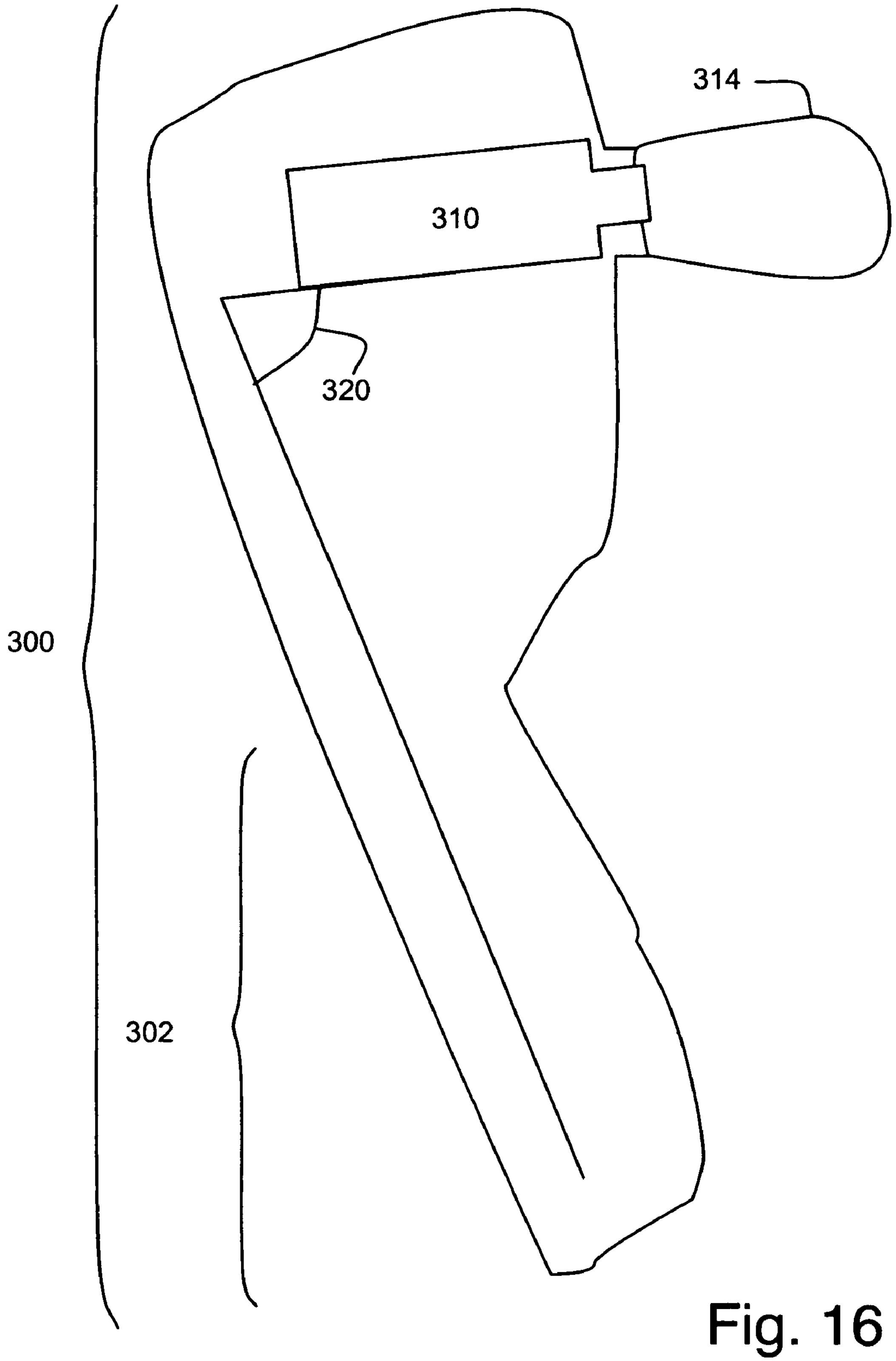

The invention's method of affecting the interior of human flesh will be described through its implementation mechanisms. The invention includes implementations of a number of mechanisms supporting this method, including the means for providing 100 the modulated power signal 10, as shown in FIGS. 1A, 1B, and further developed in FIGS. 1C to 13B, a hand held vibrating massager including the solenoid 310 delivering the modulated solenoid action 312 to the mechanical interface 314, as shown in FIGS. 14 to 16, and pieces of furniture including the solenoid and mechanical interface 314, as shown in FIGS. 17A to 17E.

Figure 1B:
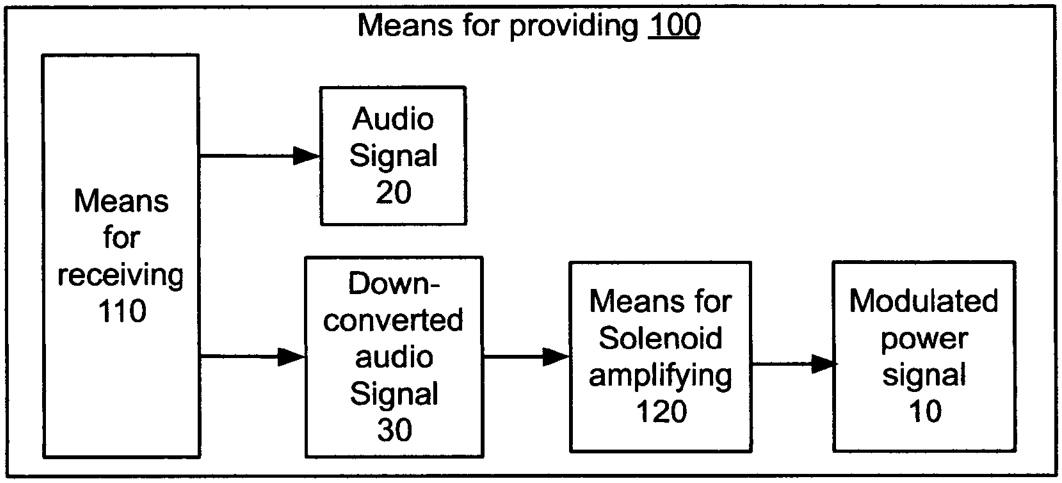
Figure 1C:
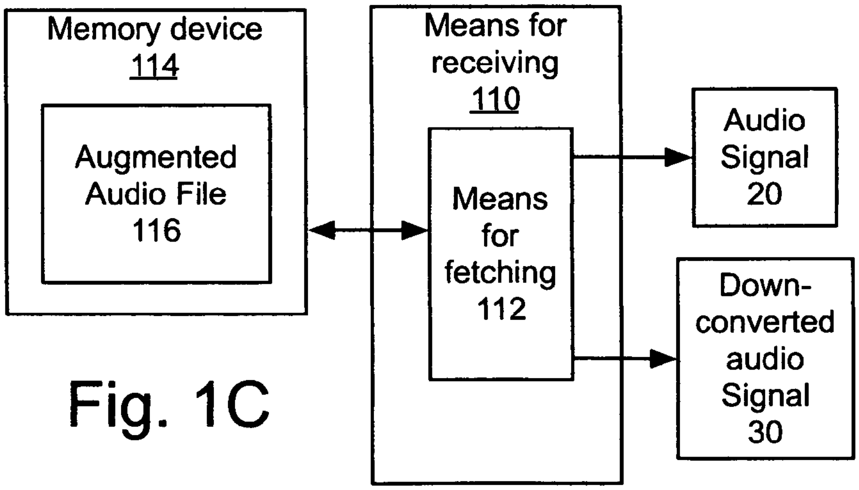

Turning first to implementations based upon the means for providing 100 the modulated power signal 10, it may include a means for receiving 110 an audio signal 20 to create the modulated power signal, as shown in FIG. 1B. The means for solenoid amplifying 120 receives the down-converted audio signal 30 to create the modulated power signal 10. FIG. 1C shows an example of the means for receiving including a means for fetching 112 communicatively coupled to a memory device 114 to provide the audio signal 20 and the down-converted audio signal 30.

The memory device 114 may include an augmented audio file 116 from which both the audio signal and the down-converted audio signal used to affect the interior of human flesh 2. The memory device may include at least one instance of at least one of the following shown in FIG. 2B: a non-volatile memory device 114-N, a volatile memory device 114-V, a hard disk drive 114-HD, an optical disk drive 114-OD, and a network storage device 114-NS communicating across a network, including at least one physical transport layer. The physical transport layer may be a wireline physical transport or a wireless physical transport. The invention includes both the augmented audio file and the memory device containing augmented audio file.

FIG. 2C shows an example of the means for solenoid amplifying 120 of FIG. 1B, including the down-converted audio signal 30 presented to a means for gating 122, which also receives a high power source 124 to create at least one modulated power component signal 12, and at least one back EMF snubbing circuit 126 receiving the at least one modulated power component signal to create the modulated power signal 10 through suppressing the back electromagnetic force from the solenoid 310 of FIG. 1A.

Figure 3A:
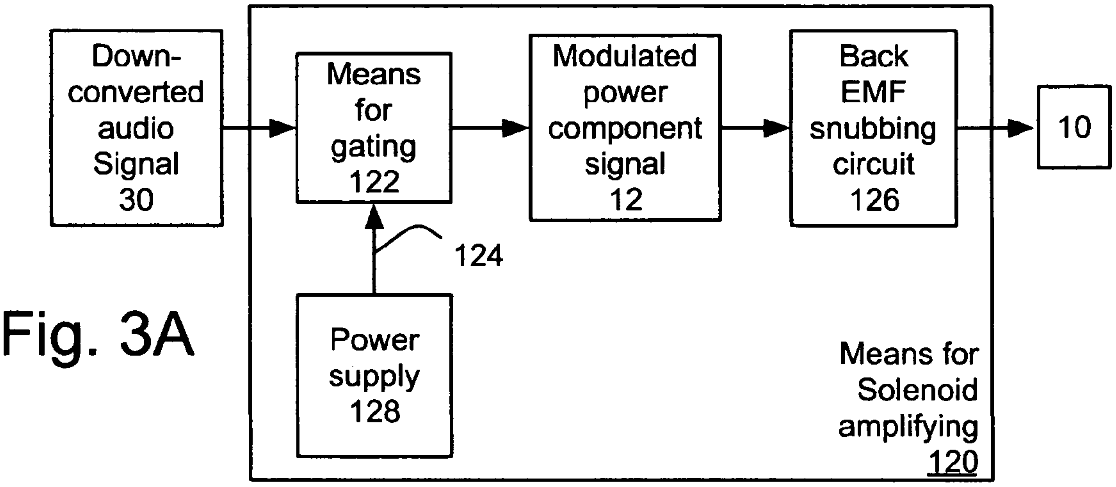
Figure 3B:
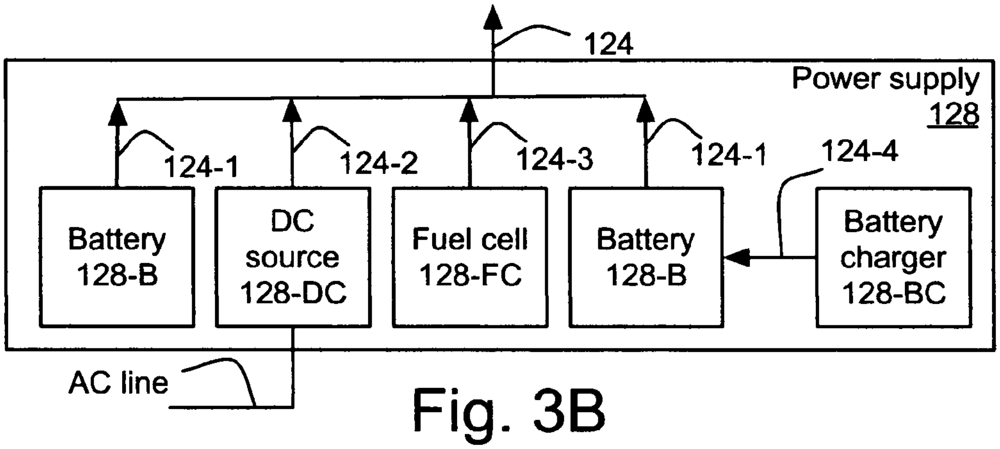
Figure 3C:
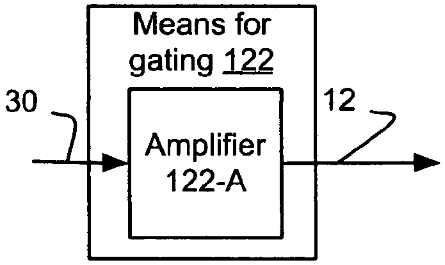
Figure 3D:
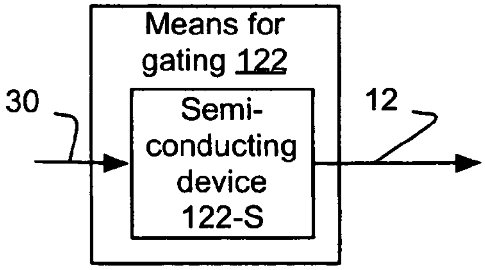

FIG. 3A shows a refinement of FIG. 2C including a power supply 128 providing the high power source 124. The power supply is shown in FIG. 3B to include at least one instance of at least one of the following: a battery 128-B to create a first high power source 124-1, a direct current source 128-DC driven by an Alternating Current line (AC line) to create a second high power source 124-2, a fuel cell 128-FC to create a third high power source 124-3, and a battery charger 128-BC providing a fourth high power source 124-4 electrically coupled with the battery to support creating the first high power source.

The means for gating 122 include at least one instance of any of the following examples shown in FIGS. 3C to 4C. An amplifier 122-A with an OPerating Frequency response (OPF) including at least twenty Herz (Hz) to at most 70 Hz, as shown in FIG. 4D. A semi-conducting device 128-S with the operating frequency response. A vacuum tube 128-VT with the operating frequency response. A silicon rectifier 128-SCR with the operating frequency response. A triac 128-Tr with the operating frequency response.

Figure 4A:
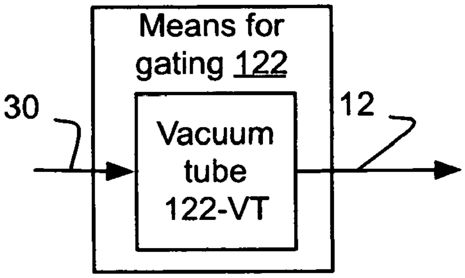
Figure 4B:
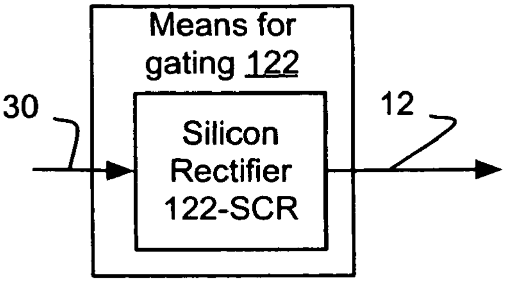
Figure 4C:
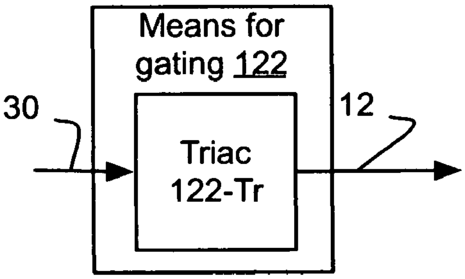
Figure 4D:
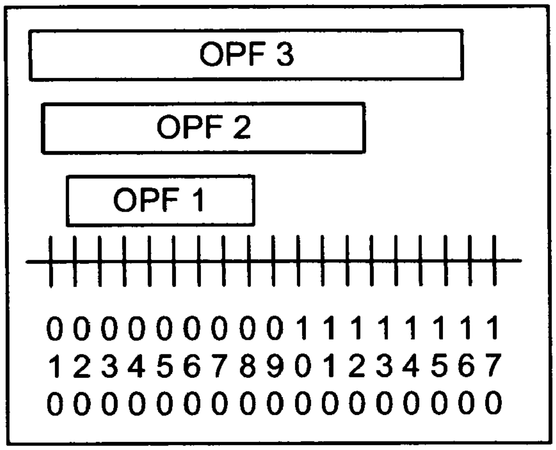

The operating frequency response may further include at least ten Hz to at most one hundred twenty eight Hz shown as OPF 2 in FIG. 4D. The operating frequency response may further, preferably, include at least eight Hz to at most one hundred sixty Hz shown as OPF 3.

The amplifier 122-A is preferably at least one the following: a Class A amplifier, a Class B amplifier, a Class C amplifier, a Class D amplifier, an operational amplifier, a linear amplifier, and a differential amplifier.

The semi-conducting device 122-S preferably includes at least one instance of at least one of the following: a bipolar semiconductor, a Field Effect Transistor (FET), and an amorphous semiconductor.

The back EMF snubbing circuit 126 of FIG. 2C includes at least one instance of any of the following examples shown in FIGS. 4E to 5B.

Figure 4E:
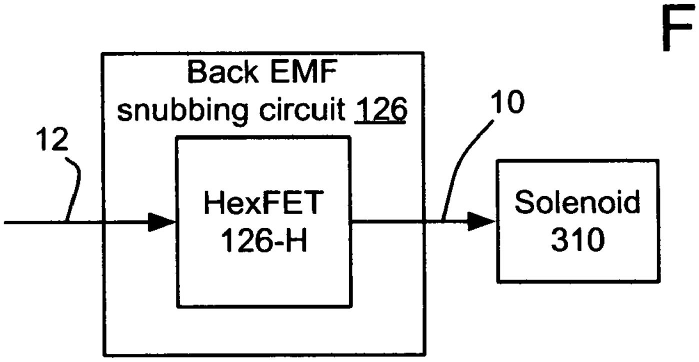
Figure 4F:
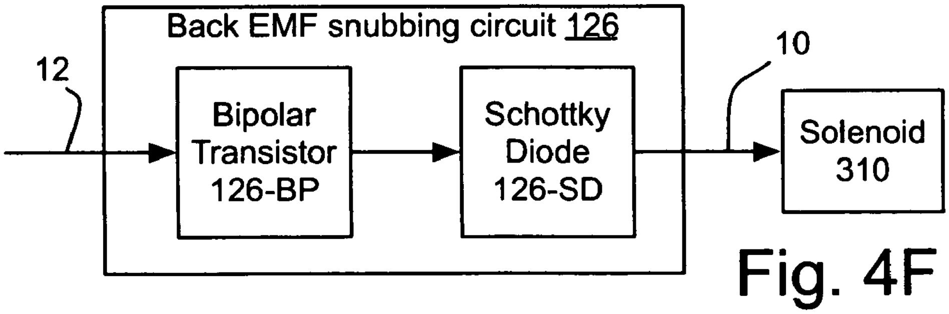
Figure 5A:
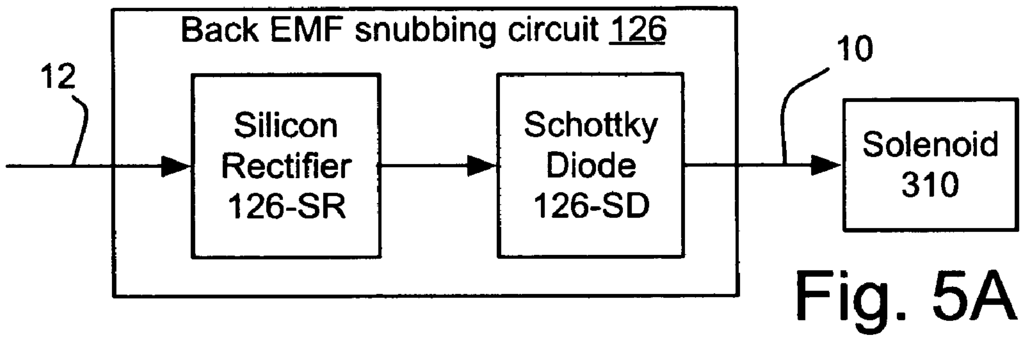
Figure 5B:
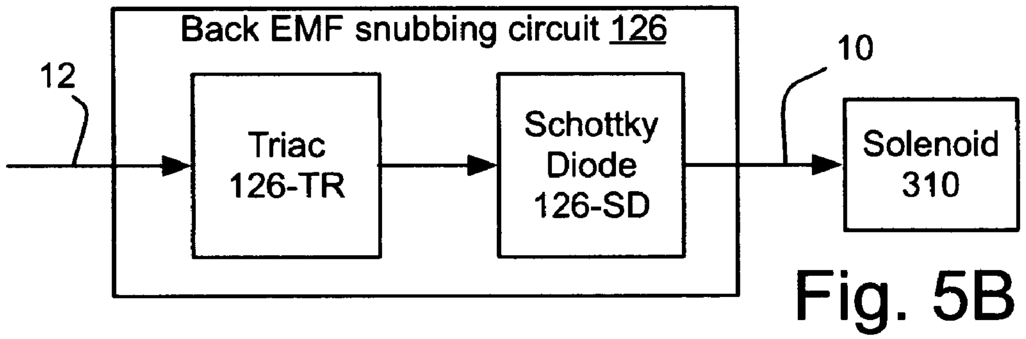
Figure 5C:
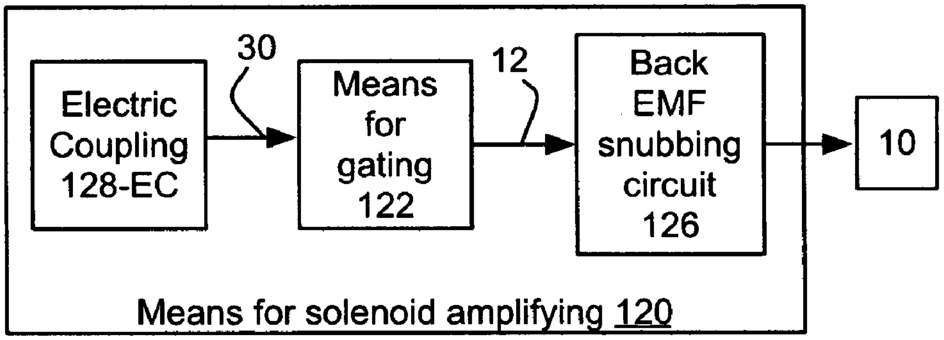
Figure 5D:
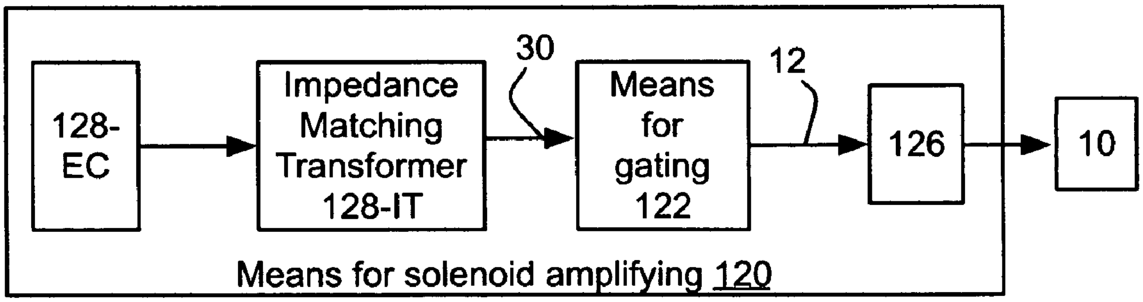

- A hexfet 126-H receiving the modulating power component signal 12 and driving at least one terminal of the solenoid 310 by providing a low resistance on-path, a high resistance off-path to create the modulated power signal 10 and suppresses the back electromagnetic force from the solenoid as in FIG. 4E.
- A bipolar transistor 126-BP receiving the modulating power component signal and driving the at least one terminal of the solenoid by providing a low resistance on-path, a high resistance off-path to create the modulated power signal, and both the on-path and the off-path coupling to a schottky diode 126-SD suppressing the back electromagnetic force from the solenoid as in FIG. 4F.
- A silicon rectifier 126-SCR receiving the modulating power component signal and driving the at least one terminal of the solenoid by providing a low resistance on-path, a high resistance off-path to create the modulated power signal, both the on-path and the off-path coupling to the schottky diode suppressing the back electromagnetic force from the solenoid as in FIG. 5A.
- A triac 126-Tr receiving the modulating power component signal and drives at least one terminal of the solenoid by providing a low resistance on-path, a high resistance off-path to create the modulated power signal, both the on-path and the off-path coupling to the schottky diode suppressing the back electromagnetic force from the solenoid as in FIG. 5B.

The means for solenoid amplifying 120 may further include at least one instance of the following examples shown in FIGS. 5C to 6A. An electric coupling 128-C providing the down-converted audio signal 30. The electrical coupling includes at least two contacts, and in certain preferred implementations, more than two contacts. The electrical coupling driving an impedance matching transformer 128-IT to provide the down-converted audio signal. And, the electrical coupling in parallel with the two resistive inputs 128-RI of a potentiometer 128-POT providing a proportioned output 128-PO to the impedance matching transformer to provide the down-converted audio signal.

Alternatively, the means for receiving 110 may include the audio signal 20 received by a means for frequency down converting 130 to create down-converted audio signal 30 as in FIG. 2A. The means for receiving may include the means for fetching 112 communicatively coupled to the memory device 114, as in FIG. 6B. The means for fetching may include the memory device as in FIG. 6C. The means for providing 100 may include the memory device 114 presenting the audio signal 20 to the means for frequency down converting, as in FIG. 6D.

Figure 7:
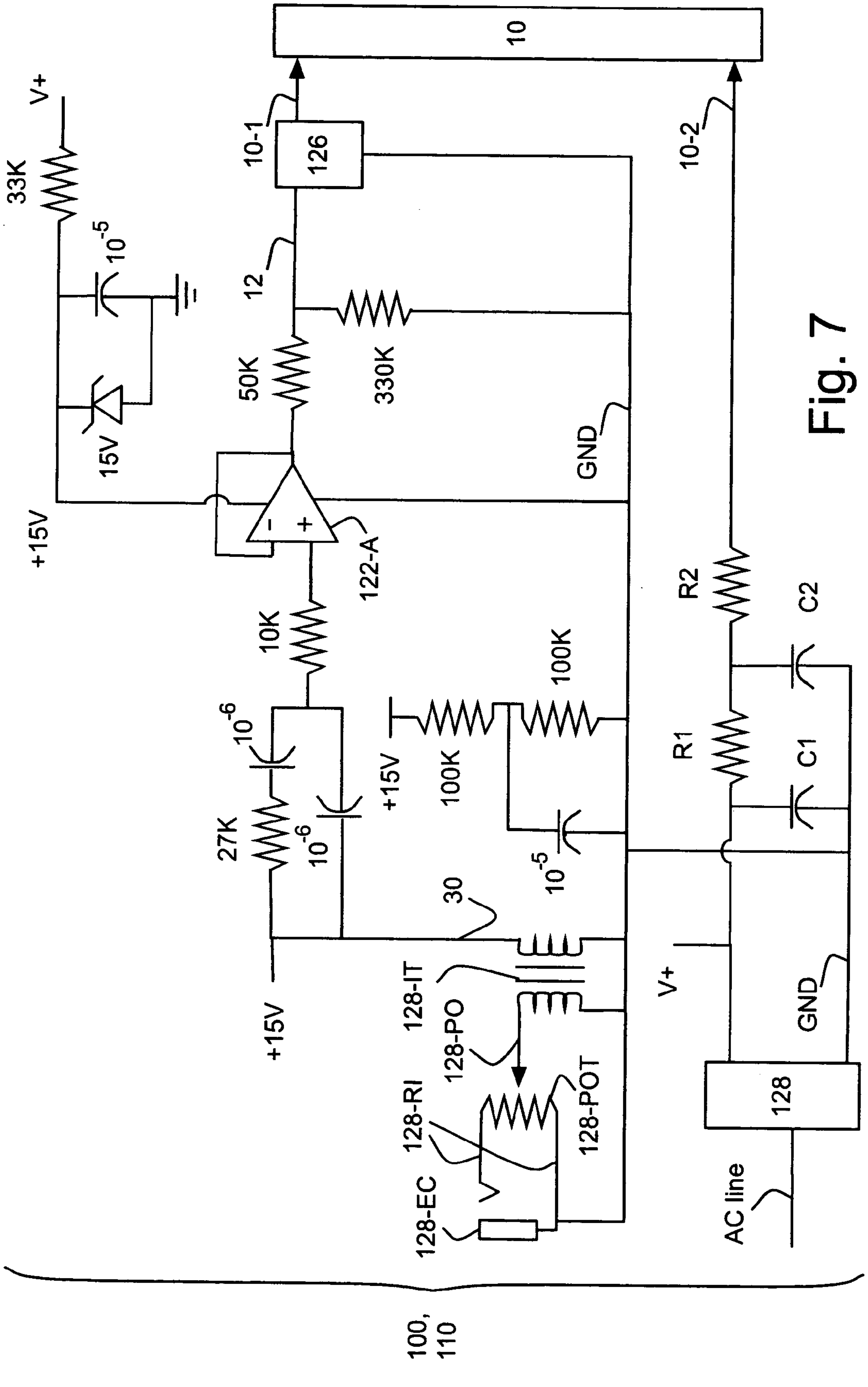

FIG. 7 shows a preferred example of the means for providing 100, in particular, the means for receiving 110.

- The means for solenoid amplifying 128 includes the electrical coupling 128-EC, in parallel with the two resistive inputs 128-RI of a potentiometer 128-POT providing a proportioned output 128-PO to an impedance matching transformer 128-IT to provide the down-converted audio signal 30.
- The means for gating 122 includes the amplifier 122-A.
- The electrical coupling is preferably a female RCA ⅛ inch plug. The potentiometer is preferably a 10K Ohm potentiometer.
- The impedance matching transformer matches an eight Ohm output impedance, typical of a personal computer or portable music player, to a ten thousand Ohm input impedance of the amplifier.
- The amplifier is a TL072 integrated circuit amplifier.
- The modulated power signal 10 includes a first modulated power signal 10-1 and a second modulated power signal 10-2, which are collectively provided to the two terminals of the solenoid 310.
- The capacitors in this Figure are rated in terms of Farads, with the exception of C1 refers to 2 micro-Farads at 200 Volts, and C2 refers to 470 micro-Farads at 200 Volts.
- The resistors are rated in Ohms, with the exception of R1 refers to a 10 Ohm 2 Watt resistor, and R2 refers to an 18 Ohm 5 Watt resistor.
- The Zener diode is rated for 15 Volts.
- The power supply 128 provides the V+, as well as ground (GND) and 15 Volt signals, and through an RC network, drives the second modulated power signal 10-2.

Figure 8A:
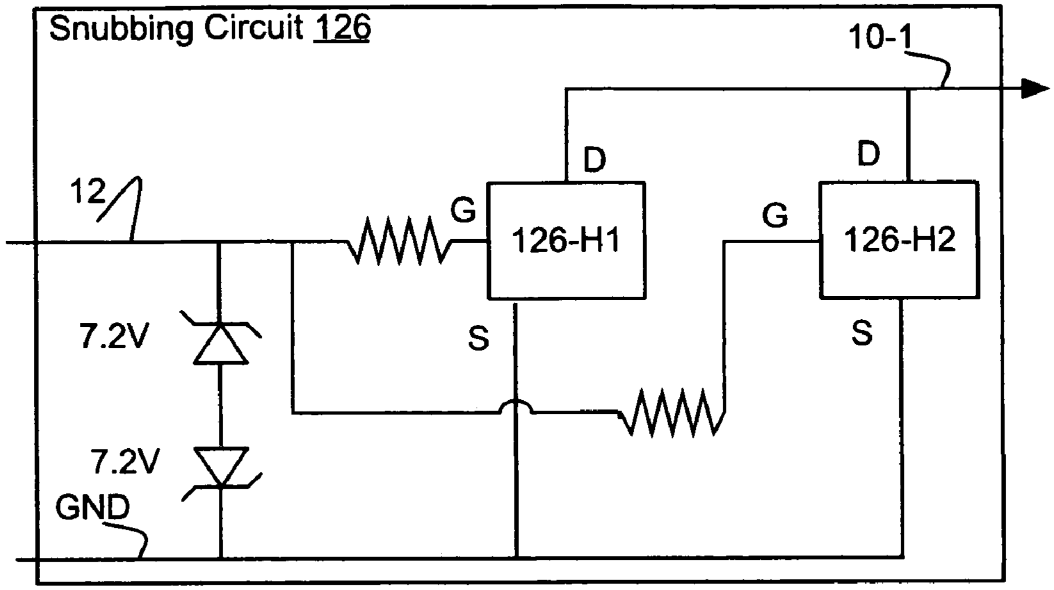

The back EMF snubbing circuit 126 of FIG. 7 is further shown in FIG. 8A, including two instances of a hexfet 126-H of FIG. 4E, the first instance hexfet 126-H1, and the second instance hexfet 126-H2. Both instances receive the modulating power component signal 12 across a resistor at their gate G. Both instances have their Source S tied to ground GND. And both instances have their Drain D tied to the first modulated power signal 10-1.

Returning to the discussion of the means for frequency down-converting 130 of FIG. 2A, examples of this means are shown in FIGS. 8B to 13B. The invention includes the means for frequency down-converting receiving the audio signal 20 and generating the down-converted audio signal 30 for presentation to the means for solenoid amplifying 120. These examples each show the audio signal feeding an input First In First Out (FIFO) 132-IF. An input window 134-IW provides access to the first out end of the input FIFO without altering the input FIFO by the access. These examples also show an output window 134-OW feeding an output FIFO 134-OF, where the output window can be accessed without altering the output FIFO. When an output window value or values are completely calculated, they are sent to the output FIFO.

Finite Impulse Response (FIR) filtering may be used to create the down-converted audio signal. The means for frequency down-converting 130 includes a means for FIR filtering 132-FIR of the input window 134-IW to alter the output window 134-OW is shown in FIGS. 8B and 9B.

An output control 14-FIR for the means for FIR filtering may be provided. In certain implementations, the output control may preferably indicate the number of tones of frequency down conversion are to be implemented. By way of example, in western music there are typically twelve tones in an octave, which spans one binary power of two in frequency from its lowest tone to its highest tone. Often these tones are equally distributed on a logarithmic scale between the lowest tone and the highest.

Figure 8B:
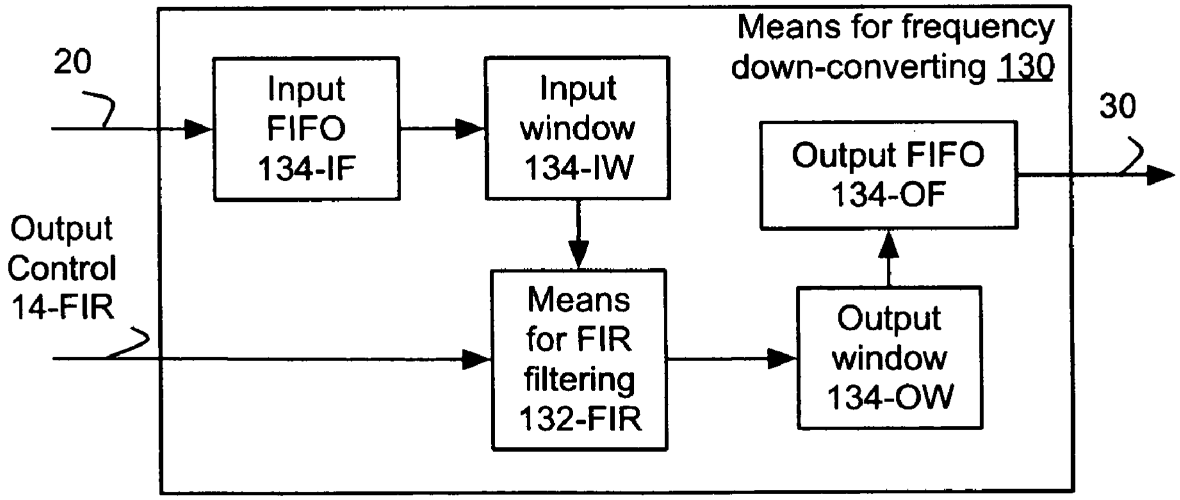
Figure 9A:
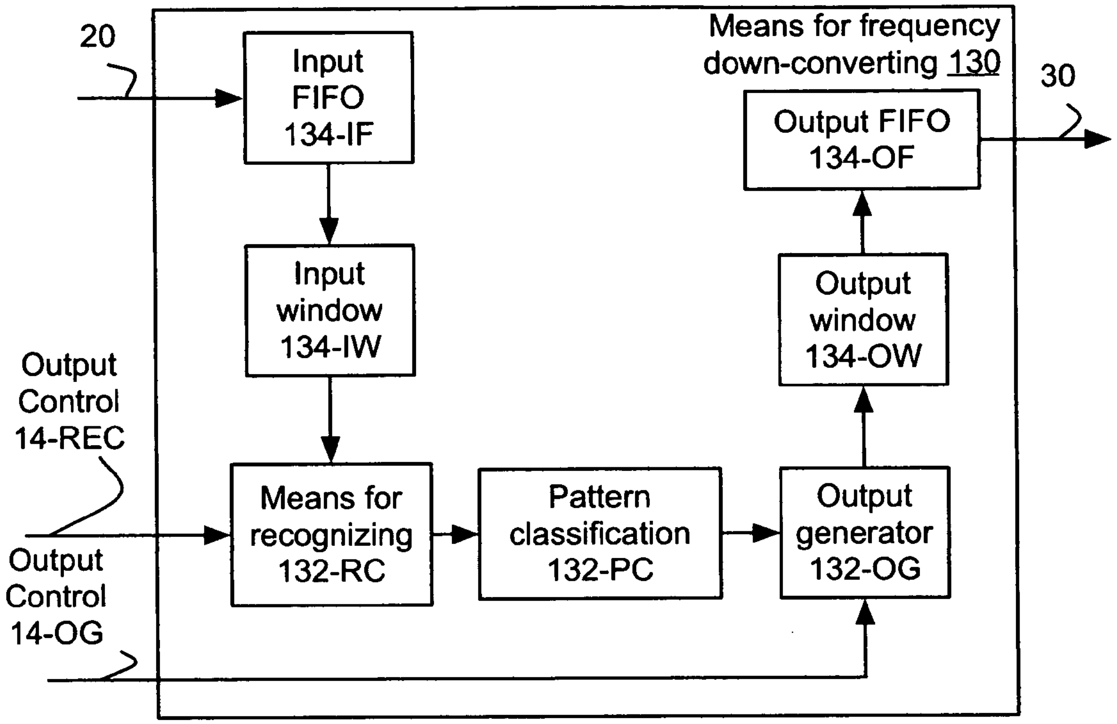
Figure 9B:
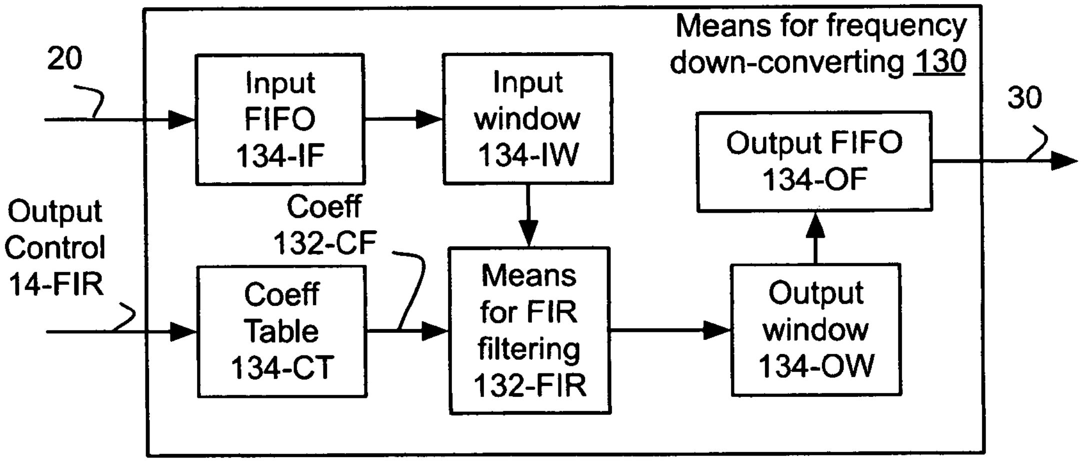

FIG. 9B shows a refinement of the means for frequency down-converting 130 of FIG. 8B, where the output control 14-FIR is used to control addressing of a coefficient table 134-CT. The coefficient 134-CF is selected in part based upon the output control, so that the FIR filter coefficients for each tone's down-conversion are stored in the table and used when appropriate. The coefficients may be stored as fixed point or floating point numbers, or may represented by their logarithms.

Pattern recognition may be used to control an output generator to implement the means for frequency down-converting 130, as shown in FIG. 9A, which may include means for recognizing 132-RC at least one pattern based upon the input window 134-IW to create a pattern classification 132-PC driving an output generator 134-OG to alter the output window 134-OW.

An output control 14-REC may direct the means for recognizing 132-RC and an output control 14-OG may direct the output generator 132-OG. By way of example, the output control 14-REC may indicate an input octave, and the means for recognizing may be directed to recognize the strength of each tone in that octave from the input window 134-IW on the input FIFO 134-IF of the audio signal 20. The pattern classification 132-PC may include those tone strengths. The output control 14-OG may indicate the target output octave that the output generator will use to alter the output window based upon the tone strengths.

Figure 10:
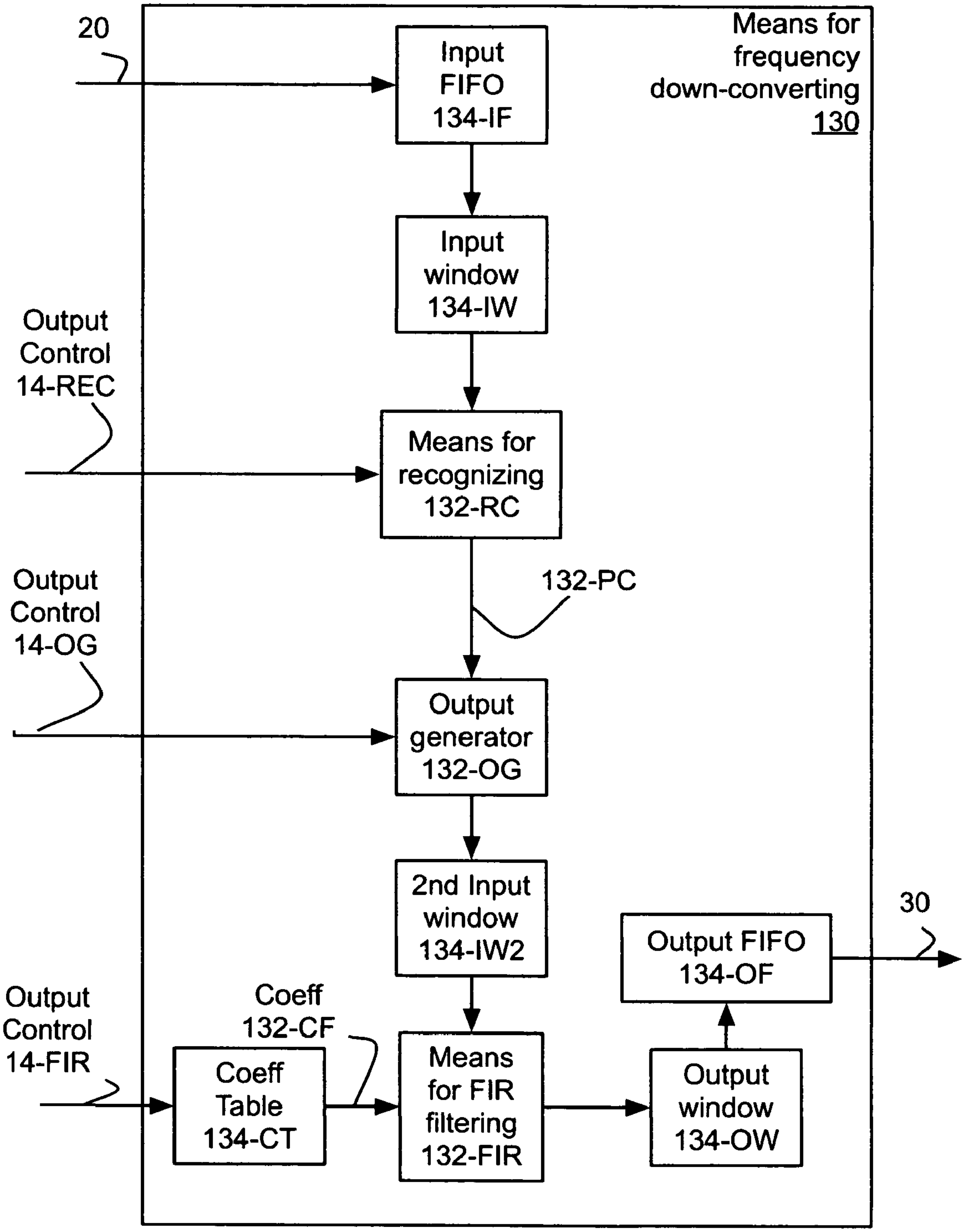
Figure 11:
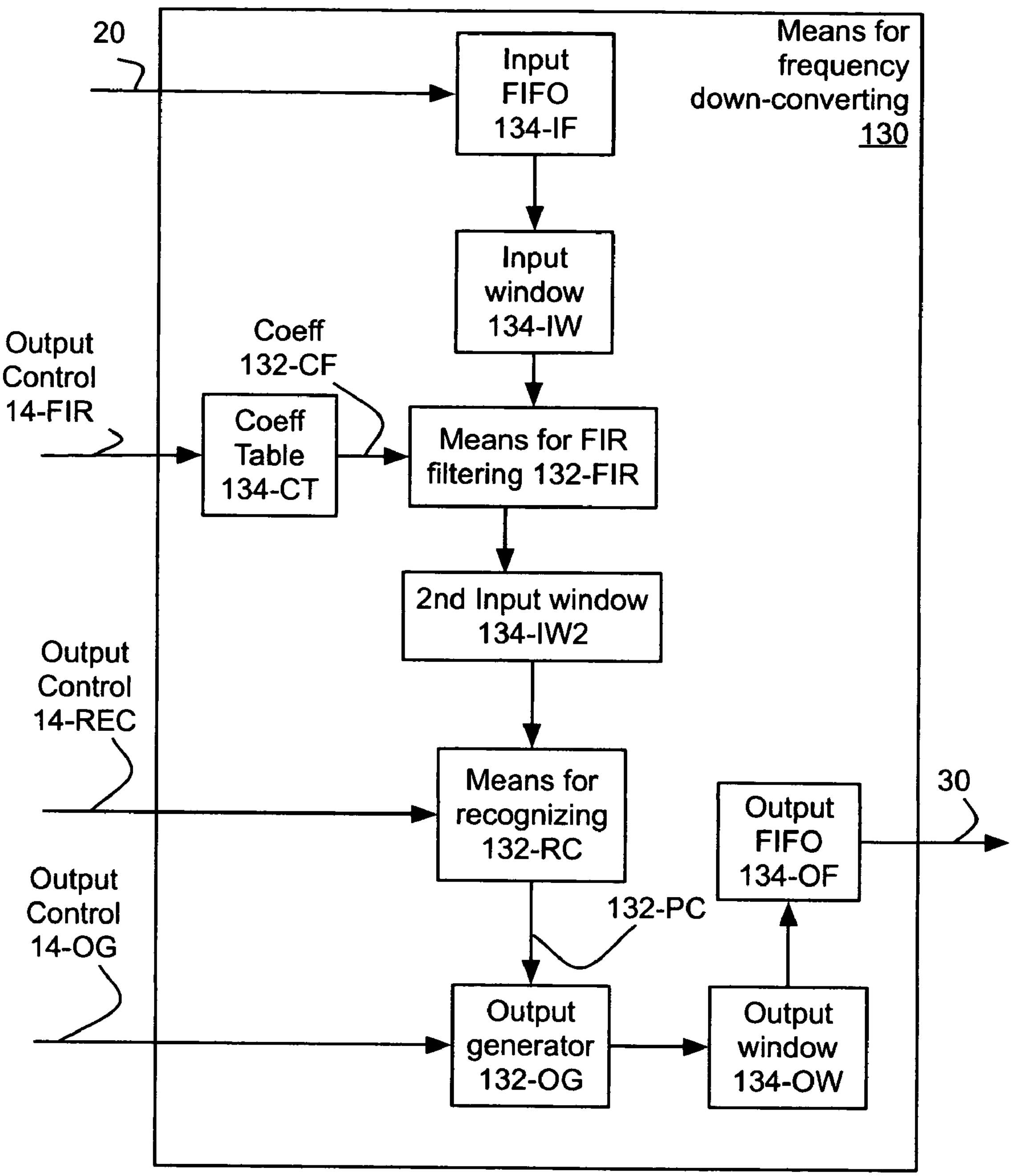

FIGS. 10 and 11 show two examples of the means for frequency down-converting 130 using both FIR filtering and pattern recognition to drive an output generator. In either Figure the stage nearest the input window can be used to do the frequency down-converting, and the stage closest to the output window can be used to remove undesirable artifacts such as sudden attacks and sudden decays in the down-converted signal, which may feel harsh to the human flesh 2.

In FIG. 10, the first stage includes the means for recognizing 132-RC generating the pattern classification 132-PC to drive the output generator 132-OG, which alters a second input window 134-IW2, which may act in part as a FIFO. The second stage includes the means for FIR filtering 132-FIR using the second input window and the coefficient 132-CF from the coefficient table 134-CT to alter the output window 134-OW.

In FIG. 11, the first stage includes the means for FIR filtering 132-FIR, which alters the second input window 134-IW2. The second stage includes the means for recognizing 132-RC patterns in the second input window to create the pattern classification 132-PC, which drives the output generator 132-OG.

Figure 12A:
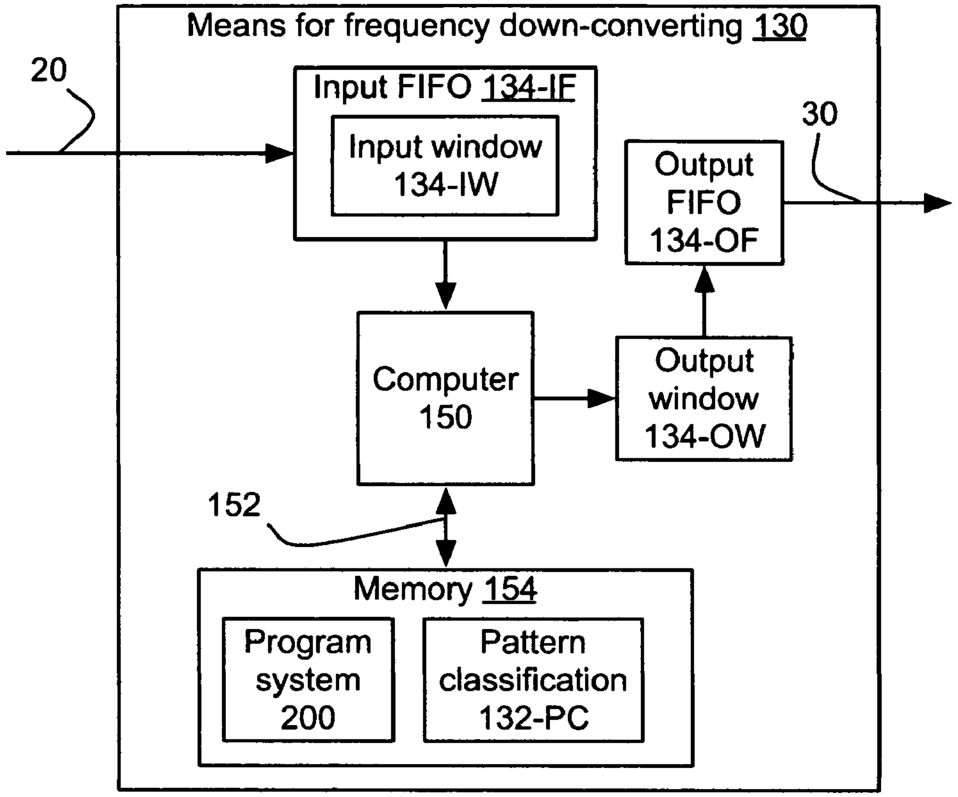
Figure 13A:
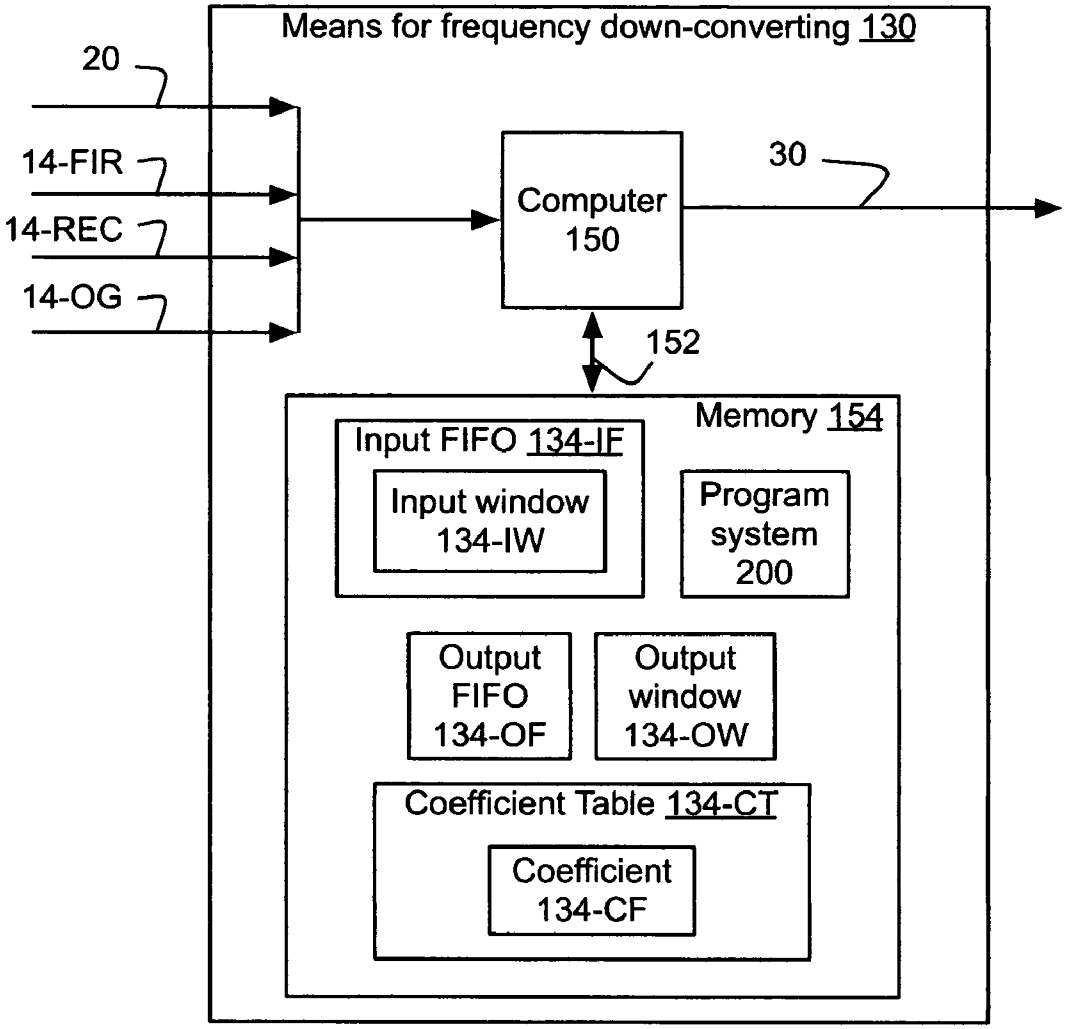

The means for frequency down-converting 130 may include a computer 150 accessibly coupled 152 to a memory 154 and directed by a program system 200, as shown in the examples of FIGS. 12A and 13A.

Some of the following figures show flowcharts of at least one method of the invention, which may include arrows with reference numbers. These arrows signify a flow of control, and sometimes data, supporting various implementations of the method. These include at least one the following: a program operation, or program thread, executing upon a computer; an inferential link in an inferential engine; a state transition in a finite state machine; and/or a dominant learned response within a neural network.

The operation of starting a flowchart refers to at least one of the following. Entering a subroutine or a macro instruction sequence in a computer. Entering into a deeper node of an inferential graph. Directing a state transition in a finite state machine, possibly while pushing a return state. And triggering a collection of neurons in a neural network. The operation of starting a flowchart is denoted by an oval with the word "Start" in it.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network. The operation of terminating a flowchart is denoted by an oval with the word "Exit" in it.

A computer as used herein will include, but is not limited to, an instruction processor. The instruction processor includes at least one instruction processing element and at least one data processing element. Each data processing element is controlled by at least one instruction processing element.

FIG. 12A shows the computer accessing the input window 134-IW of the input FIFO 134-IF and altering the output window 134-OW, which feeds the output FIFO 134-OF. The pattern classification 134-PC may reside in the memory 154.

FIG. 13A shows a variation on the example of FIG. 12A, where the computer 150 receives the audio signal 20, possibly the output controls 14-FIR, 14-REC and/or 14-OG, and maintains the input FIFO 134-IF, the input window 134-IW, the output window 134-OW, and the output FIFO 134-OW, to drive the down-converted audio signal 30. The memory 154 may contain the input FIFO, the input window, the output window and the output FIFO.

Figure 12B:
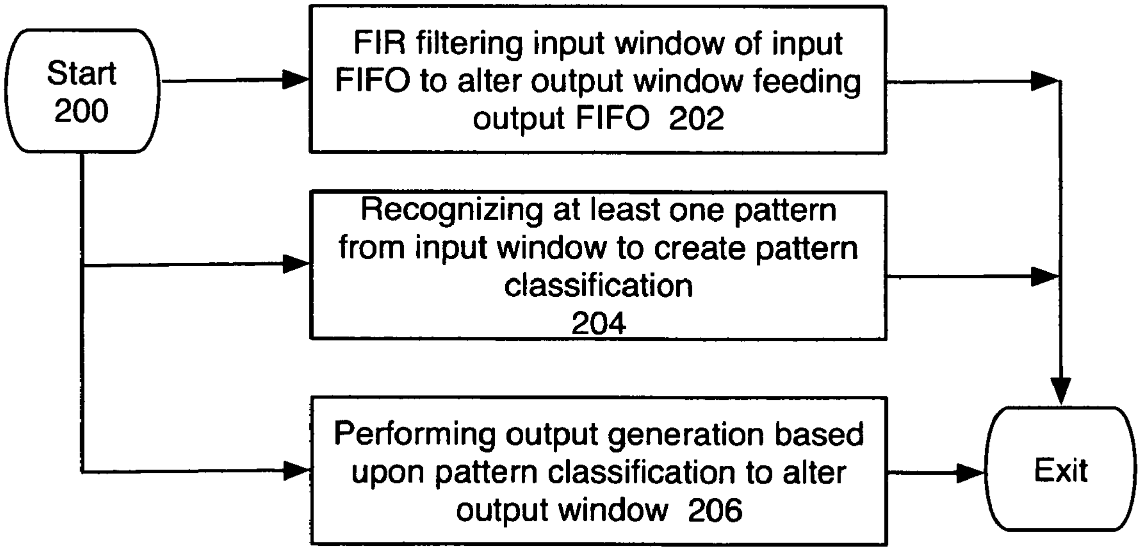

The program system 200 may preferably direct the computer 150 of FIGS. 12A and/or 13A to support at least one of the operations shown in FIG. 12B. Operation 202 supports FIR filtering the input window 134-IW of the input FIFO 134-IF to alter the output window 134-OW feeding the output FIFO 134-OF. Operation 204 supports recognizing the at least one pattern based upon the input window to create the pattern classification 134-PC. Operation 206 supports performing the output generator 132-OG based upon the pattern classification to alter the output window feeding the output FIFO.

Figure 13B:
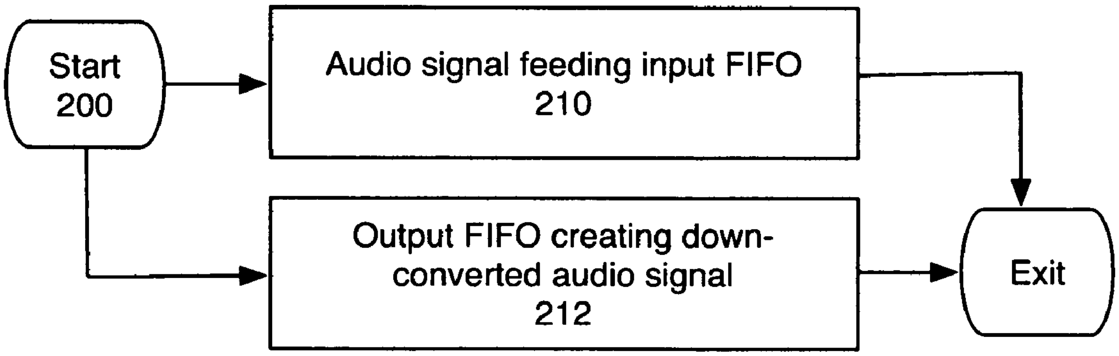

The program system 200 may further preferably direct the computer 150 of FIG. 13A to support the operations shown in FIG. 13B. Operation 210 supports the audio signal 20 feeding the input FIFO 134-IF. Operation 212 supports the output FIFO 134-OF creating the down-converted audio signal 30.

The invention includes a hand held vibrating massager 300 including at least one of the solenoid 310 delivering the modulated solenoid action 312 to the mechanical interface 314, as shown in FIGS. 14 to 16. FIG. 16 is based upon a currently manufactured hand held vibrating massager. The invention includes using that currently manufactured hand held vibrating massager to deliver the modulated solenoid action 312 to human flesh 2, to modify the interior of the human flesh. The invention include that modification of the human flesh as a product of the invention's process of affecting the human flesh.

The hand held vibrating massager 300 may further include a head section 306 containing the solenoid situated at an angle 320 to a handle 302, as shown in FIG. 16. The inventors found that the angle 320 did not allow a single user easy access to several important parts of their own bodies. By way of example, it was difficult to massage the sides of the rib cage, the back of their neck, their genitals, their buttocks, or the back of their thighs.

The inventors found that the angle was preferred greater than ninety degrees. The invention includes the hand held massager 300 of FIG. 16 where the angle 320 is greater than ninety degrees. Further preferred the angle is at least one hundred and sixty degrees and at most two hundred degrees.

The invention further includes the hand held vibrating massager 300, including the head section 306 coupled through a mid section 304 to the handle 302, as shown in FIGS. 14 and 15. The angle 320 between the head section and the handle now includes a first angle 308-A between the head section and the mid section, and a second angle 308-B between the mid section and the handle.

FIG. 15 shows the mid section 304 being able to separate and support any of the following capabilities expanding the mid section, contracting the mid section, the capability to change the first angle 308-A and the capability to change the second angle 308-B.

Figure 17A:
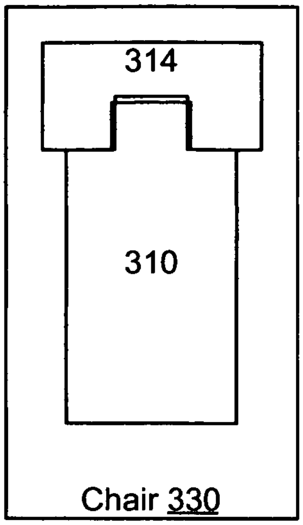
FIGS. 17A to 17E show examples of furniture including the solenoid and mechanical interface used to affect human flesh, as discussed in the previous Figures.
Figure 17B:
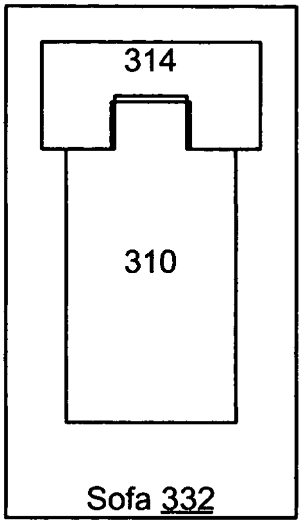
Figure 17C:
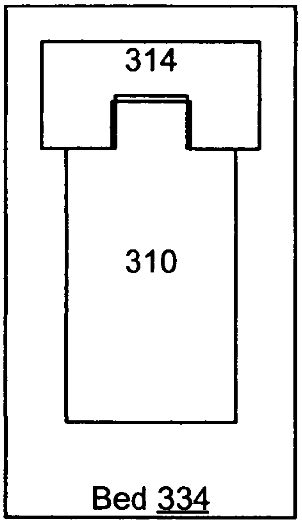
Figure 17D:
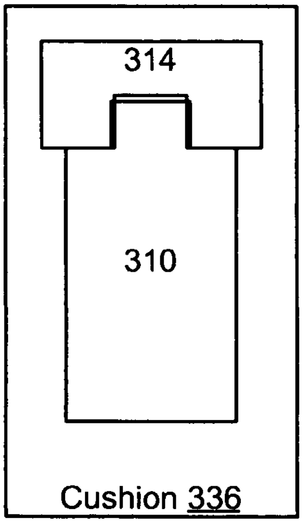
Figure 17E:
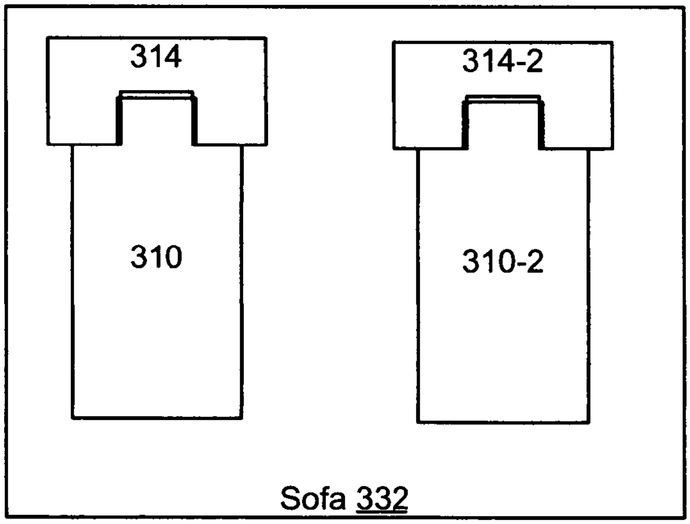

The invention also includes pieces of furniture including the solenoid 310 and mechanical interface 314, as shown in FIGS. 17A to 17E, which includes an instance of a chair 330, a sofa 332, a bed 334, and a cushion 336. The piece of furniture may include more than one solenoid and mechanical interface, as shown in FIG. 17E, where the sofa 332 which includes a second solenoid 310-2 driving a second mechanical interface 314-2.

The preceding embodiments provide examples of the invention and are not meant to constrain the scope of the following claims.

What is claimed is:

1. A method of affecting the interior of human flesh, comprising the steps: providing a modulated power signal to at least one solenoid to create a modulated solenoid action; and said solenoid delivering said modulated solenoid action through a mechanical interface to said human flesh to create a modulated audio effect into said interior of said human flesh; wherein the step providing said modulated power signal, comprises the step: receiving an audio signal to create said modulated power signal, comprising at least one member of the group consisting of the steps: fetching a down-converted audio signal and said audio signal from a memory device; fetching a down-converted audio signal and said audio signal from an augmented audio file in said memory device; and frequency-down-converting said audio signal to create said down-converted audio signal; and wherein the step receiving said audio signal, further comprises the step: solenoid amplifying said down-converted audio signal to create said modulated power signal; wherein said memory device includes at least one instance of at least one member of the group consisting of: a non-volatile memory device, a volatile memory device coupled to a battery backup, a hard disk drive, an optical disk drive, and a network storage device communicating across a network; wherein said network includes at least one physical transport layer belonging to the group consisting of a wireline physical transport and a wireless physical transport; wherein the step solenoid amplifying further comprises the steps: gating at least one high power source by said down-converted audio signal to create at least one modulated power component signal; and providing said at least one modulated power component signal through at least one back ElectroMagnetic Force (EMF) snubbing circuit to create said modulated power signal and suppress back electromagnetic force from said solenoid.

2. The modulated audio effect into said interior of said human flesh, said modulated power signal, said down-converted audio signal as products of the process of claim 1.

3. An apparatus for implementing the step of solenoid amplifying of claim 1, comprising: means for solenoid amplifying said down-converted audio signal to create said modulated power signal, further comprising: means for gating said at least one high power source by said down-converted audio signal to create said at least one modulated power component signal; and at least one back EMF snubbing circuit receiving said at least one modulated power component signal to create said modulated power signal through suppressing said back electromagnetic force from said solenoid.

4. The apparatus of claim 3, further comprising:

a power supply providing said at least one high power source to said means for gating;

wherein said power supply, comprises at least one instance of at least one member of the group consisting of:

a battery to create a first high power source;

a direct current source driven by an alternating current line to create a second high power source;

a fuel cell to create a third high power source; and a battery charger providing a fourth high power source electrically coupled with said battery to support creating said first high power source.

5. An apparatus supporting the step receiving said audio signal of claim 1, comprising means for receiving said audio signal to create said modulated power signal, further comprising at least one member of the group consisting of:

means for fetching said down-converted audio signal and said audio signal; and means for frequency-down-converting said audio signal to create said down-converted audio signal.

6. The apparatus of claim 5, wherein the means for receiving, further comprises at least one member of the group consisting of:

said means for fetching including said memory device; and said means for frequency-down-converting including said memory device providing said audio signal.

7. The apparatus of claim 5, wherein the means for frequency-down-converting comprises at least one instance of at least one member of the group consisting of:

means for Finite Impulse Response (FIR) filtering of an input window of an input First In First Out (FIFO) to alter an output window feeding an output FIFO to create said down-converted audio signal; wherein said audio signal feeds said input FIFO; and means for recognizing at least one pattern based upon said input window to create a pattern classification driving an output generator to alter said output window feeding said output FIFO to create said down-converted audio signal.

8. The apparatus of claim 7, further comprises: an output control modifying said down-converted audio signal;

wherein the means for frequency down-converting, further comprises at least one member of the group consisting of:

said output control accessing a coefficient table driving an FIR coefficient for said means for FIR filtering to modify said down-converted audio signal;

said output control asserting a pattern parameter to said means for recognizing to modify said pattern classification; and said output control asserting an output parameter to said output generator to modify said down-converted audio signal.

9. The apparatus of claim 8, wherein said output control provides at least one member of the group consisting of:

a tone count for said means for FIR filtering to frequency down convert said audio signal to create said down-converted audio signal;

said pattern parameter indicating an input frequency band pass filter to be applied by said means for recognizing; and said output parameter indicating a maximum attack and decay rate for said output generator.

10. The apparatus of claim 7, wherein the means for frequency-down-converting further comprises:

a computer accessibly coupled to a memory and directed by a program system including program steps residing in said memory;

wherein said program system, comprises at least one program step of the group consisting of:

FIR filtering said input window of said input FIFO to alter said output window feeding said output FIFO;

recognizing said at least one pattern based upon said input window to create said pattern classification; and performing said output generator based upon said pattern classification to alter said output window feeding said output FIFO.

11. The apparatus of claim 10, wherein said program system, further comprises the program steps:

said audio signal feeding said input FIFO; and said output FIFO creating said down-converted audio signal.

12. An apparatus supporting the step providing said modulated power signal of claim 1, comprising:

means for providing said modulated power signal to said at least one solenoid.

13. The augmented audio file comprising a representation of at least one of said audio signal and a representation of said down-converted audio signal, which is a frequency-down-converted version of said audio signal for use in the method of claim 1.

14. A hand held vibrating massager, comprising:

at least one of said solenoids of claim 1 receiving said modulated power signal and delivering said modulated solenoid action through said mechanical interface to said human flesh.

15. The hand held vibrating massager of claim 14, a head section containing said solenoid situated at an angle to a handle; wherein said angle is greater than ninety degrees of arc.

16. The hand held massager of claim 15, wherein said angle is at least one hundred and sixty degrees; and wherein said angle is at most two hundred degrees.

17. The hand held vibrating massager of claim 15, wherein said head section couples through a mid section to said handle; and wherein said angle is comprised of a first angle between said head and said mid section plus a second angle between said mid section and said handle.

18. The hand held vibrating massager of claim 17, wherein said mid section includes at least one member of the group consisting of: the capability to expand and contract; the capability to change said first angle; and the capability to change said second angle.

19. An apparatus, comprising: a piece of furniture including at least one of said solenoids of claim 1 receiving said modulated power signal and delivering said modulated solenoid action through said mechanical interface to said human flesh;

wherein said piece of furniture is an instance of at least one member of the group consisting of: a chair; a sofa; a bed; and a cushion.

* * * * *